United States Patent [19]

Wolff

[11] Patent Number: 5,406,407
[45] Date of Patent: Apr. 11, 1995

[54] THIRD ORDER ROOM TEMPERATURE NONLINEAR OPTICAL SWITCHES

[75] Inventor: Peter A. Wolff, Princeton, N.J.

[73] Assignee: NEC Research Institute Inc., Princeton, N.J.

[21] Appl. No.: 206,549

[22] Filed: Mar. 4, 1994

[51] Int. Cl.$^6$ ............................................. G02F 1/35
[52] U.S. Cl. .................................. 359/326; 252/501.1; 252/582; 359/241; 359/321
[58] Field of Search ........................... 359/326-332, 359/240-244, 321; 372/21, 22; 252/501.1, 518, 582, 584

[56] References Cited

U.S. PATENT DOCUMENTS

| | | | |
|---|---|---|---|
| 5,126,874 | 6/1992 | Alfano et al. | 359/240 |
| 5,132,051 | 7/1992 | Herron et al. | 252/501.1 |
| 5,202,786 | 4/1993 | Boyle et al. | 359/243 |
| 5,290,485 | 3/1994 | Gotoh et al. | 359/329 X |
| 5,318,729 | 6/1994 | Kurihara et al. | 252/582 |

OTHER PUBLICATIONS

Kathleen Kash et al, "Nonlinear optical studies of picosecond relaxation times of electrons in n-GaAs and n-GaSb", Appl. Phys. Lett. 42(2), Jan. 15, 1983 pp. 173-175.

P. A. Wolff et al, "Novel, free-carrier-induced optical non-linearities of narrow-gap semiconductors", Semicond. Sci. Technol. 5 (1990), pp. S57-S67 (no month).

C. Alibert et al, "Modulation-spectroscopy study of the $Ga_{1-x}Al_xSb$ band structure", Physical Review B, vol. 27, No. 8, Apr. 15, 1983, pp. 4946-4954.

*Primary Examiner*—John D. Lee
*Attorney, Agent, or Firm*—Philip J. Feig

[57] ABSTRACT

An optical switching device comprises a material which exhibits third order optical nonlinearity ($X^{(3)}$) at frequencies just below the band gap of the material, a room temperature and at a wavelength of approximately 1.55$\mu$. The switching device is particularly useful for optical communication applications. The preferred material is n-$Al_xGa_{1-x}Sb$, where x is approximately 0.1. Additional preferred materials are those which have a band gap (at $\Gamma$) just above the photon energy of the system and have a subsidiary conduction band (at X or L) approximately 0.1 ev above the $E_o$ level at $\Gamma$ at a predetermined wavelength. Such alloy systems include (AlGaIn)As with $0.635\mu \leq \lambda \leq 0.672\mu$, and (AlGaIn)P with $0.56\mu \leq \lambda \leq 0.65\mu$.

13 Claims, 1 Drawing Sheet

THIRD ORDER ROOM TEMPERATURE NONLINEAR OPTICAL SWITCHES

FIELD OF THE INVENTION

The present invention relates to third-order, room temperature nonlinear optical switches. Specifically, the invention concerns optical switches whose active material exhibits third order optical nonlinearity $X^{(3)}$ at frequencies substantially at the material band gap and at a wavelength of interest and preferably at a wavelength of approximately 1.55μ. Quite specifically, the invention concerns the use of $Al_xGa_{1-x}Sb$ material at room temperature for use in a third order nonlinearity optical switch, where x is approximately 0.1. The invention further concerns the use of III–IV systems operating in the visible light spectrum.

BACKGROUND OF THE INVENTION

There is great interest in finding strong, fast nonlinear optical processes in semiconductors that are effective at pump frequencies in the near infrared. In recent years, progress has been made in identifying and understanding a number of strong free carrier mechanisms that operate at longer wavelengths, near 10μ. These processes can product large third order optical nonlinearities with relaxation times in the picosecond range. Third order nonlinear susceptibilities exceeding $10^{-6}$ esu with picosecond relaxation times have been observed. Unfortunately, most of these mechanisms have proven unsuitable for use at wavelengths in the 1.55μ range. They fail to make the transition from 10μ to 1.55μ either because the nonlinearity is too small at shorter wavelengths to be useful, or because the mechanism relies upon a pump photon resonance that cannot be extended to the 1.55μ spectral range. The 1.55μ wavelength is crucial for long distance optical communication applications, because at this wavelength optical fibers have zero dispersion, thus enabling digital optical signals to travel long distance without broadening.

The valley-transfer mechanism potentially can overcome these shortcomings and produce a strong, fast nonlinearity in the near infrared. The valley-transfer mechanism is described, for example, in an article by K. Kash et al, entitled "Nonlinear optical studies of picosecond relaxation times of electrons in n-GaAs and n-GaSb" in Applied Physics Letters, volume 42, number 2, pages 173–175, January, 1983.

When a semiconductor has subsidiary valleys in the conduction band, electrons can be driven from the primary valley to subsidiary valleys by light. The large difference in electron effective mass between the two valleys can then lead to a sizable optical nonlinearity. Kash's work has shown, however, that electrons are driven from one valley to another by optical heating, rather than by direct photon absorption. As a consequence, at room temperature the valley transfer nonlinearity is exceedingly weak in a material such as n-GaAs since, in it, carrier temperature modulation about 300 K is insufficient to excite carriers over the large barrier (Δ≃0.3 ev), between the Γ and L-valleys. Kash, in fact, could only observe a sizable valley transfer nonlinearity in n-GaAs when the samples were heated to 800 K. The material n-GaSb, with Δ≃0.08 ev, is much more favorable than n-GaAs in this regard. In it, Kash and Walrod (unpublished) have observed a large, room temperature nonlinearity ($X^3 \simeq 10^{-6}$ esu) in experiments performed with $CO_2$ lasers whose frequencies are well below the GaSb bandgap.

The scaling of the value of the valley transfer nonlinearity to a pump laser of shorter wavelength is governed by the variation of free carrier induced third order nonlinear susceptibility, $X^{(3)}$, with laser frequencies:

$$X^{(3)} \sim \frac{1}{(\omega_1)^2 \omega_2 \omega_3}. \tag{1}$$

where $\omega_1 \simeq \omega_2 \simeq \omega_3$ are optical frequencies in a nonlinear mixing process.

In the absence of other effects one would anticipate from Kash's and Walrod's results, a $X^{(3)}$ in n-GaSb at 1.5μ of approximately $4 \times 10^{-10}$ esu. It is well known, however, that optical processes in semiconductors are strongly enhanced (the solid state analogue of resonance fluorescence) as the laser frequency approaches a direct band gap, according to the formula:

$$X^{(3)} \sim \left[ \frac{E_G^2}{E_G^2 - (\hbar\omega)^2} \right]^2. \tag{2}$$

Previous experience suggests that this fact could enhance the near IR $X^{(3)}$ of GaSb to $4 \times 10^{-8}$ esu, which is sizable.

Low absorption is also essential for the successful application of a nonlinearity. The moderate doping levels required to activate the valley-transfer process mean that the free carrier absorption will be fairly low, making valley transfer a particularly attractive mechanism for devices. At λ=1.55μ, the free carrier absorption coefficient is estimated to be 1 $cm^{-1}$. Combining this value with the predicted $X^{(3)}$ of $4 \times 10^{-8}$ and the measured relaxation time of 1 ps, gives a potential figure of merit $[X^{(3)}/\alpha T]$ of $4 \times 10^4$, which exceeds that of GaAs excitonic processes, that typically have figures of merit in the $10^2$ range. Of course if band gap resonance is used to increase $X^{(3)}$, there will be a corresponding increase in linear absorption. Thus, there will be a tradeoff between a larger magnitude of nonlinearity and lower linear absorption.

Using a thermal theory of free-carrier-induced optical nonlinearities, Wolff and Auyang in an article entitled "Novel free-carrier-induced optical non-linearities of narrow-gap semiconductors" in Semicond. Sci. Technol, Vol. 5, pages S57–S67, 1990, predict a $X^{(3)}$ of the form $$X^{(3)} = \frac{c n_o \alpha \tau_{th}}{96\pi^2(1 - i\Delta\omega\tau_{th})} \frac{d\epsilon}{dY} \frac{1}{c_v} \frac{dY}{dT}, \tag{3}$$

where $n_o$=index of refraction, $\alpha$=free carrier absorption coefficient, $\epsilon$=free carrier contribution to the dielectric function, $c_v$ is the electronic specific heat, $\tau_{th}$ the thermal relaxation time of the carriers, and Y the parameter modulated by carrier temperature fluctuations. For the valley-transfer process, Y is the density of electrons in the Γ-valley. At thermal equilibrium:

$$Y \equiv n_\Gamma = \frac{n}{(1 + g e^{-\beta\Delta})}, \tag{4}$$

where $g \simeq 60$ is the ratio of state densities for the L and Γ-valleys, and $\Delta$ the energy difference between them. Differentiation shows that $$\frac{dY}{dT}$$

has its largest value when $$\beta\Delta = \ln(g) - \ln\left(\frac{\beta\Delta - 2}{\beta\Delta + 2}\right). \quad (5)$$

With $g=60$, Eq. (5) implies $\beta\Delta \simeq 4$, or $\Delta \simeq 0.1$ ev for optimal room temperature operation. The material n-GaSb, with $\Delta = 0.08$ ev, comes very close to satisfying this condition. Combining all these results with the expression for free carrier absorption gives $$X^{(3)} = \frac{ne^4}{9m^*\omega^4\Delta}\left(\frac{\tau_{th}}{\tau}\right)\left[\frac{E_c^2}{E_G^2 - (\hbar\omega)^2}\right]^2 \quad (6)$$

where it has been assumed that $\Delta\omega\tau_{th} << 1$. It should be noted that the form of $X^{(3)}$ in Eq. (5) is similar to that calculated for the nonparabolicity process, but with $E_G$ replaced by $\Delta$. This similarity can be understood by noting that both mechanisms rely upon the thermal excitation of electrons to states that have different characteristics from those at the band edge. As compared with nonparabolicity, the valley transfer process has $30\times$ larger nonlinearity because a much smaller excitation energy ($\Delta$ vs. $E_G$) is required to produce a substantial mass change.

At wavelengths below its bandgap, GaSb is a nearly optimal material for the valley transfer process at room temperature. Unfortunately, however, its bandgap is too small for use in 1.55μ optical devices. The material n-GaSb is barely transparent to 1.55μ radiation at 4 K and becomes opaque with increasing temperature because its bandgap decreases to 0.73 ev ($\lambda_c = 1.70\mu$) at 300 K, i.e. room temperature.

SUMMARY OF THE INVENTION

The above limitation can be overcome by using wider gap n-Al$_x$Ga$_{1-x}$Sb with x approximately 0.1, as the optical switch material in order to retain the advantageous features of the valley-transfer process arising from the near coincidence of the Γ-band edge with the subsidiary conduction band minima. Alibert et al in an article entitled "Modulation-spectroscopy study of the Ga$_{1-x}$Al$_x$Sb band structure" in Physical Review, B27 (8), 4946–4954, (1983) reported detailed modulation-spectroscopy measurements of the Al$_x$Ga$_{1-x}$Sb band structure. The experiments were performed on bulk polycrystalline ingots (grain size of several mm$^3$) and on single crystal LPE layers 50μ thick. These measurements determined linear-optical properties, as contrasted with third-order nonlinearities required in optical switches. For $x=0.1$, the values $E_G = 0.84$ ev and $\lambda_c = 1.48\mu$, are nearly optimal for an optical switch operating at 1.55μ. The value of $\lambda_c$ is sufficiently smaller than 1.55μ that n−Al$_{0.1}$Ga$_{0.9}$Sb, a preferred material, is relatively transparent at 1.55μ. Simultaneously, $\lambda = 1.55\mu$ is sufficiently close to $\lambda_c$ to provide strong, resonant enhancement of the optical nonlinearity (by approximately two orders of magnitude). The band structure of Al$_x$Ga$_{1-x}$Sb for $x=0.1$ is similar to that of pure GaSb so that, Al$_x$Ga$_{1-x}$Sb will generate a sizable value of $X^{(3)}$. The value of $X^{(3)}$ of n−Al$_{0.1}$Ga$_{0.9}$Sb is estimated to be 60 percent of that of pure n-GaSb, which is adequate for use as an optical switch. The value of $X^{(3)}$ at 1.55μ might be optimized in an (Al-GaIn)Sb alloy of suitable concentration.

Having described the characteristics of the preferred switch material, that is, exhibiting a third order optical nonlinearity at room temperature at an operating wavelength of approximately $\lambda = 1.55\mu$, the novel use of such material in an optical switch will now be described.

In order to accomplish digital optical communication, optical switching by means of a non-linear device for use with a laser is required. The simplest nonlinear optical device is a bistable optical element comprising an n−Al$_x$Ga$_{1-x}$Sb crystal with highly reflecting mirrors on oppositely disposed faces forming a Fabry-Perot structure to achieve bistability. The cavity length is adjusted so that the pump frequency initially is off resonance. At low power levels the device then reflects most of the impinging light. As the power increases, the cavity mode frequency is shifted by the nonlinearity of the crystal material, making the structure more transparent. The process results in bistability and hysteresis.

By combining such a Fabry-Perot structure with a control beam, it is possible to use such a structure as an optical switch.

Other devices, such as logic gates, flip-flops, memory elements, amplifiers and so forth can also be fabricated based on the described bistable Fabry-Perot structure.

In accordance with the teachings of the present invention, a third order room temperature optical device includes an active material that ha a direct bandgap (at Γ) just above the photon energy of the system and has a subsidiary conduction band (at X or L) about 0.1 ev above the E$_0$ level at Γ.

In the present invention a preferred material is Al$_x$Ga$_{1-x}$Sb, where x is approximately 0.1, for use in an optical switch intended to operate at a wavelength of approximately $\lambda = 1.55\mu$.

The invention will be best understood when the following description is read in conjunction with the accompanying drawings.

DETAILED DESCRIPTION

Figure 1:
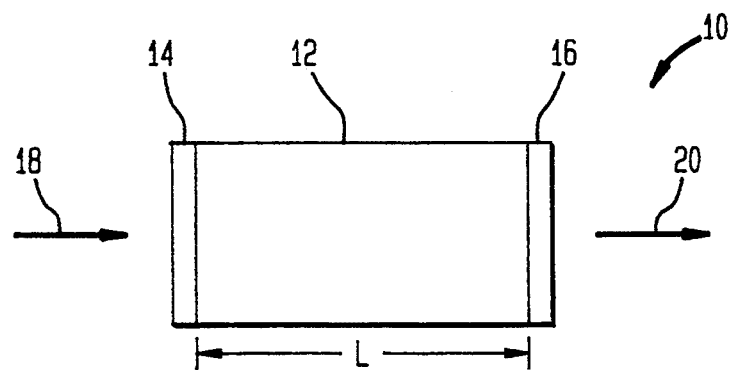
FIG. 1 is a schematic representation of a bistable optical element.

Referring now to the figures and to FIG. 1 in particular, there is shown a schematic representation of a nonlinear optical device 10, such as a bistable optical element, comprising crystal material 12 with highly reflecting mirrors 14,16 disposed at opposite end surfaces of the crystal material to form a Fabry-Perot structure. Fabry-Perot structures are well known as are methods for adjusting the cavity length L. The crystal material is selected to exhibit optical nonlinearity at frequencies just below the band gap of the material. In order to be most useful as a switching element in an optical communication system, the material is preferably selected for exhibiting third order optical nonlinearity at room temperature at a wavelength of approximately 1.55μ. A preferred material for use as an optical switch in communication systems is n-type $Al_xGa_{1-x}Sb$ material, where x is approximately 0.1.

The bistable activity is achieved when the cavity length L is adjusted so that the pump frequency of the cavity is off resonance. As a result, at low power levels, most of the input light 18, for example from a laser (not shown), incident at mirror 14 is reflected. As the power level is increased, the cavity mode frequency is shifted by the nonlinear characteristics of the crystal material 12, making the material more transparent, enabling the light 18 to pass through mirror 14, crystal material 12 and mirror 16 to exit as an output light beam 20.

Figure 2:
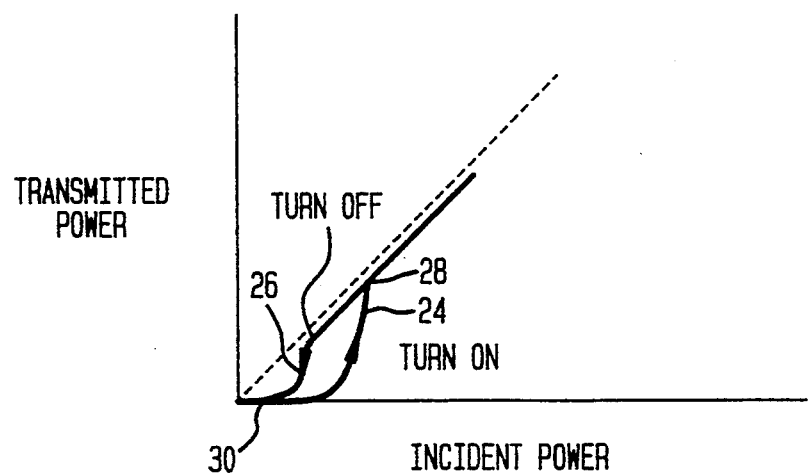
FIG. 2 is a graphical representation of the bistability and hysteresis of the element in FIG. 1.

The process results in bistable action and hysteresis as graphically illustrated in FIG. 2. FIG. 2 is a graphical representation of the incident power versus the transmitted power of a bistable device. The curve portion 24 is the turn on path of the device and the curve portion 26 is the turn-off path of the device. The device switches from reflecting to transmitting states and vice versa when the incident power is equal to that at points 28 and 30 respectively. The power at point 28 is typically in that order of 100 kW/cm² for Fabry-Perot finesse of 50 and $X^{(3)} = 4 \times 10^{-8}$ esu. Such power densities are within the range of current semiconductor laser technology.

Figure 3:
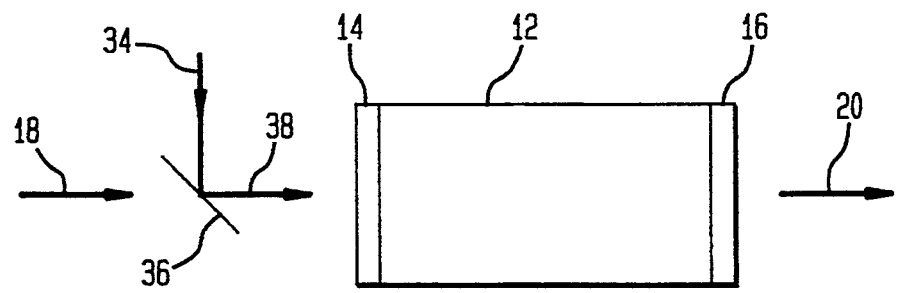
FIG. 3 is a schematic representation of a modified bistable optical element for operation as an optical switch.

FIG. 3 shows a modification of the device in FIG. 1 for operation as a switching element. Similar elements in both FIGS. 1 and 3 are referred to by the same identifying reference numerals.

The light beam 18, referred to as the signal beam having power density $E_s$, is combined with a control beam 34 having power density $E_c$ at a beam combiner 36 to form a combined incident light beam 38.

By selecting a material 12 which exhibits a sizable third order optical nonlinearity ($X^{(3)}$) just below the bandgap of the material at room temperature, the power density of the output beam 20 is proportional to the product of $E_s$ and $E_c^2$. Hence, the control beam can cause the switching device 10 to selectively transmit the signal beam information energy $E_s$ to the output beam 20.

It is most desirable to achieve a layer resonant enhancement of $X^{(3)}$ as predicted by eq. (1) above. In order to achieve large, valley transfer nonlinearities at 1.55μ, it is essential to use a direct gap semiconductor with bandgap $E_G \approx 0.84$ ev (for strong resonant enhancement) and a small splitting (Δ) between the Γ-valley and subsidiary conduction band valleys. The optimal value of Δ for room temperature operation is approximately 0.1 ev, where $E_G$ is the direct bandgap of the semiconductor, and $\lambda_c$ is the corresponding cutoff wavelength, below which the material is opaque. For operation at other wavelengths one would use different x-values for the material $Al_xGa_{1-x}Sb$. (Achievable in the range of approximately 1.55μ to 1.70μ.)

The use of n-$Al_{0.1}Ga_{0.9}Sb$ as the active material in a third order nonlinearity optimal switching device at room temperature yields previously unforeseen results. Alibert's experiments show that at 300 K, n-$Al_{0.1}Ga_{0.9}Sb$, has values of $E_G = 0.84$ ev and $\lambda_c = 1.48\mu$. These values of $E_G$ and $\lambda_c$ are desirable for an optical switch operating at 1.55λ. The value $\lambda_c = 1.48\mu$ is sufficiently below the desired operating wavelength of 1.55μ so that the material is relatively transparent at $\lambda = 1.55\mu$. At the same time, the operating wavelength is sufficiently close to $\lambda_c$ in order to provide strong, resonant enhancement of the optical nonlinearity by approximately two orders of magnitude. The close the value of $\lambda_c$ is to the operating wavelength the more nonlinearity the material exhibits. However, as $\lambda_c$ approaches the operating wavelength, the losses in the material increase. That is, nonlinearity enhancement is stronger closer to the operating wavelength, but losses in the material consequently increase. The value of $X^{(3)}$ for n-$Al_{0.1}Ga_{0.9}Sb$ is estimated to be approximately 60 percent of that of pure n-GaSb, which will assure performance of the switch in optical communication applications.

High potential speed of the device is assured by the short relaxation time of the valley transfer process, estimated to be approximately 2 psec at room temperature.

While the above description is made with reference to a bistable switch, the principles are equally applicable to other optical devices, such a logic gates, flip-flops, memory elements, amplifiers and the like.

The use of $Al_xGa_{1-x}Sb$ material in an optical switch primarily for use in optical communication, where x is approximately 0.1, results in an optical switch exhibiting a third order nonlinearity at room temperature at as operating wavelength of approximately $\lambda = 1.55\mu$. Such an optical switch possessing these characteristics has not been described previously.

While the primary objective of this invention is a device configuration and active material that is capable of providing efficient nonlinear optical elements at the wavelength ($\lambda = 1.55\mu$) of primary importance for long distance optical communication, for short haul communications (within buildings or between buildings in a city) dispersion is less of a factor, so it may be desirable to design such a communications systems at more convenient wavelengths (ideally within the visible spectrum) than $\lambda = 1.55\mu$. The principles embodied in the invention, at 1.55μ can also be used to design efficient nonlinear optical elements at such other wavelengths. Specifically, the active material of the device must satisfy the following two requirements:

1. Have a direct band gap (at Γ) just above the photon energy of the system, and
2. Have a subsidiary conduction band (at X or L) about 0.1 ev above the $E_o$ level at Γ. It has been previously shown that these conditions optimize the valley transfer nonlinearity at room temperature.

Several quaternary semiconductor alloy systems satisfy these requirements.

1) $0.635\mu \leq \lambda \leq 0.672\mu$ (1.86 ev $\leq \hbar\omega \leq$ 1.95 ev) in a (AlGaIn)As system at room temperature. This wavelength range includes that of some visible Ga(AsP) lasers (that lase for $0.65\mu \leq \lambda \leq 0.84\mu$). It does not encompass the visible He-ne laser at 0.6328μ.

2) $0.56\mu \leq \lambda \leq 0.65\mu$ (1.90 ev $\leq \hbar\omega \leq$ 2.21 ev) in the (AlGaIn)P system at room temperature.

3) Finally, these conditions should be achieved in a $Ga_xIn_{1-x}As_yP_{1-y}$ system.

While there has been described and illustrated a preferred embodiment of a third order, room temperature nonlinear optical switching device, it will be apparent to those skilled in the art that variations and modifications are possible without deviating from the broad principles and spirit of the invention which shall be limited solely by the scope of the claims appended hereto.

What is claimed is:

1. A third-order room temperature nonlinear optical switch at a wavelength approximately of $\lambda=1.55\mu$ comprising a material $Al_xGa_{1-x}Sb$, where x is approximately 0.1.

2. A third-order room temperature nonlinear optical switch at a wavelength of approximately $\lambda=1.55\mu$ as set forth in claim 1, where the material exhibits transition energy ($E_G$) of approximately 0.8 ev.

3. A third-order room temperature nonlinear optical switch at a wavelength of approximately $\lambda=1.55\mu$ as set forth in claim 2, where the material has a cutoff wavelength ($\lambda_c$) which enables the material to exhibit transparency and provide resonant enhancement of the optical nonlinearity at the operating wavelength.

4. A third-order room temperature nonlinear optical switch at a wavelength of approximately $\lambda=1.55\mu$ as set forth in claim 3, wherein the value of $\lambda_c$ is approximately $1.48\mu$.

5. A third-order room temperature nonlinear optical switch at a wavelength of approximately $\lambda=1.55\mu$ as set forth in claim 1, where the material has a cutoff wavelength ($\lambda_c$) which enables the material to exhibit transparency and provide resonant enhancement of the optical nonlinearity at the operating wavelength.

6. A third order room temperature nonlinear optical switch comprising material which has a band gap (at $\Gamma$) just above the photon energy of the system and has a subsidiary conduction band (at X or L) approximately 0.1 ev above the $E_o$ level at $\Gamma$ at a predetermined wavelength.

7. A third order room temperature nonlinear optical switch as set forth in claim 6, where the material is (AlGaIn)As for operation at a wavelength substantially in the range between $0.635\mu$ and $0.672\mu$.

8. A third order room temperature nonlinear optical switch as set forth in claim 6, where the material is (AlGaIn)P for operation at a wavelength substantially in the range between $0.56\mu$ and $0.65\mu$.

9. A third order room temperature nonlinear optical switch as set forth in claim 6, where the material is $Al_xGa_{1-x}Sb$ where x is approximately 0.1 for operation at a wavelength approximately $\lambda=1.55\mu$.

10. A third order room temperature nonlinear optical device comprising material with highly reflecting mirrors disposed at opposite end surfaces of said material to form a Fabry-Perot structure, said material having a bandgap (at $\Gamma$) just above the photon energy of the system and having a subsidiary conduction band (at X or L) approximately 0.1 ev above the $E_o$ level at $\Gamma$ at a predetermined wavelength.

11. A third order room temperature nonlinear optical device as set forth in claim 10, where the material is (AlGaIn)As for operation at a wavelength substantially in the range between $0.635\mu$ and $0.672\mu$.

12. A third order room temperature nonlinear optical device as set forth in claim 10, where the material is (AlGaIn)P for operation at a wavelength substantially in the range between $0.56\mu$ and $0.65\mu$.

13. A third order room temperature nonlinear optical device as set forth in claim 10, where the material is $Al_xGa_{1-x}Sb$ where x is approximately 0.1 for operation at a wavelength approximately $\lambda=1.55\mu$.

* * * * *